May 1, 1945.   E. C. HERTHEL   2,374,996
PROCESS
Filed June 18, 1941
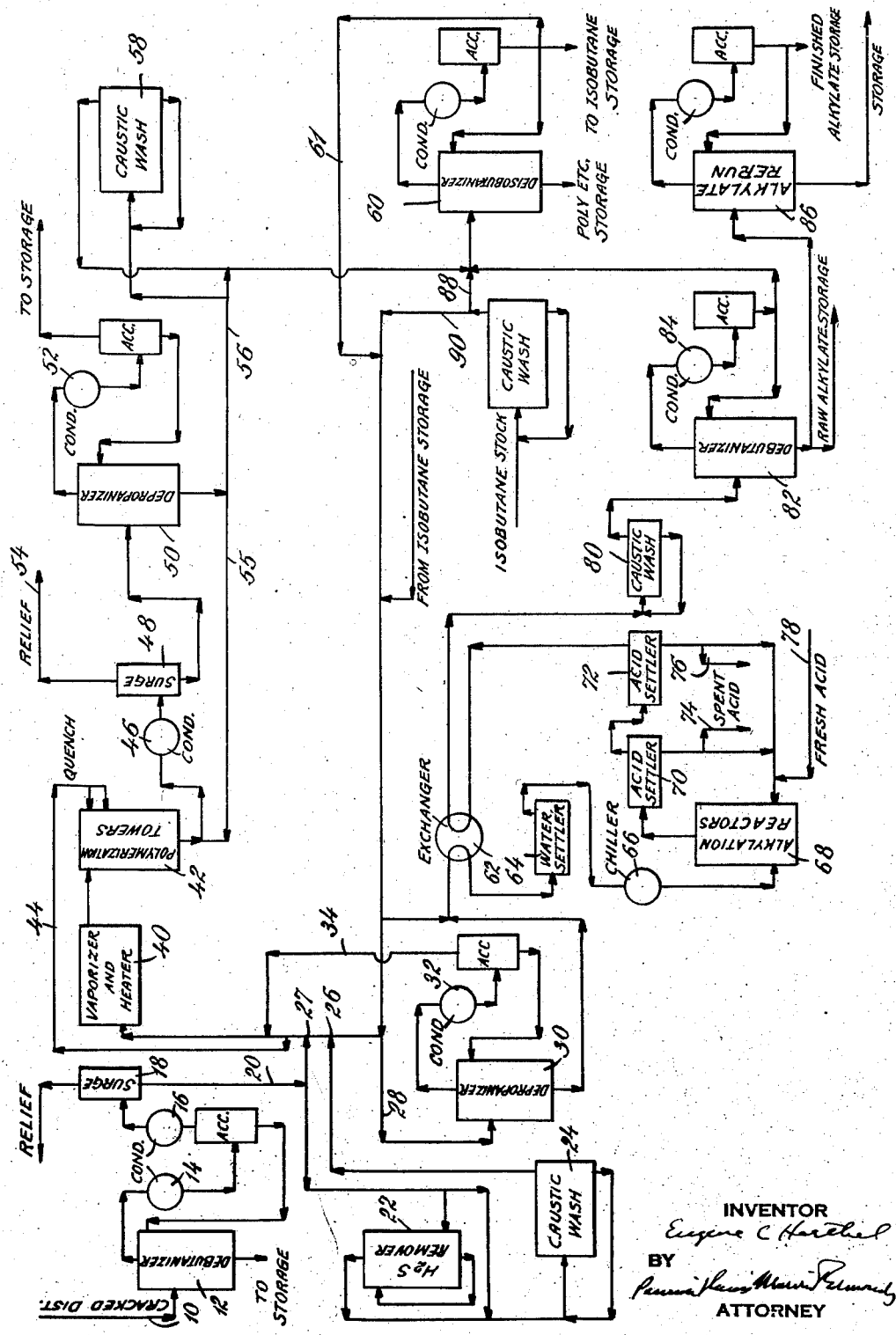
INVENTOR
Eugene C Herthel
BY
ATTORNEY Patented May 1, 1945

2,374,996

UNITED STATES PATENT OFFICE 2,374,996

PROCESS

Eugene C. Herthel, Flossmoor, Ill., assignor to Sinclair Refining Company, New York, N. Y., a corporation of Maine Application June 18, 1941, Serial No. 398,509

9 Claims. (Cl. 260—683.4)

This invention relates to improvements in the production of motor fuels from certain normally gaseous hydrocarbons.

In the production of cracked gasolines, a rather large proportion of hydrocarbon gases, ranging up to the hydrocarbons containing four carbon atoms and higher, is produced. Included among these hydrocarbons are olefins, such as propylene and the isomeric butylenes as well as saturated hydrocarbons including butane and isobutane.

The present invention provides improvements in the utilization of these normally gaseous hydrocarbons which permit, not only the production of motor fuel therefrom, but the production of the maximum quantity of the highest grade motor fuel.

Processes are known by which olefins, including propylene and the isomeric butylenes, may be subjected to polymerization or copolymerization for the production of a product useful as a motor fuel. Processes are also known by which olefins, and particularly butylenes, may be alkylated by isobutane to produce isoparaffins, and especially isooctane, of outstanding value as a high octane aviation gasoline. Generally speaking, this alkylated product is superior to products produced by processes involving polymerization of olefins.

In accordance with the present invention, the normally gaseous products from a cracking operation, for example, the fraction obtained by debutanizing a cracked distillate, is divided into two parts, one containing that amount of butylenes which is slightly less, on a molar basis, than the total amount of isobutane available, together with associated propylene, propane, butane, isobutane, etc., and the other containing the remainder of the fraction. The first portion is subjected to depropanization, and is then passed to the alkylation reaction zone, with appropriate cooling, and with the addition of more isobutane, derived as hereafter explained. The other portion, supplemented by the overhead from the depropanization of the first portion, and any other gaseous olefins which may be available, is subjected to a polymerization operation. The saturated hydrocarbons present in the portion which goes through the polymerization apparatus are unaffected by this treatment, and appears in the product therefrom in its original form. The substantial amount of isobutane which is charged to the polymerization unit is thus unchanged by the operation, is recovered and used for alkylation.

While the amount of isobutane fed to the alkylation reaction zone is substantially in excess of the stoichiometric proportion based on the olefin supplied, because an excess of isobutane favors the alkylation reaction and minimizes losses or degradation of the quality of the product due to interreaction of olefins in the alkylation reaction zone, unreacted isobutane is recovered from the alkylate stock and returned to the reaction zone, and the portion of the original fraction fed to the alkylation reaction is therefore adjusted so that the amount of butylenes in it is slightly less than the total amount of isobutane in the cracked distillate available, plus the amount available through outside sources, practically all of this isobutane eventually being used in the alkylation reaction, even though it is previously passed through the polymerization unit or is otherwise processed.

As a large excess of isobutane is fed to the alkylation reaction zone, the hydrocarbon withdrawn from that zone will contain not only the desired alkylate, but also this excess isobutane and whatever other saturated hydrocarbon was fed to the zone together with minor portions of other hydrocarbons. Recovery of the isobutane from this reaction product is accomplished by passing it through a debutanizer, the overhead from which is passed through a deisobutanizer, from which the isobutane, and any lighter hydrocarbons, are recovered as an overhead product. In this deisobutanizer, normal butane, which does not enter into the alkylation reaction, is largely removed from the system, along with any butene-2 (the least reactive of the butylenes) which has not reacted in the polymerization units, and, as explained below, the polymer from the polymerization operation.

The product of the polymerization operation, usually after depropanization, is advantageously introduced into the deisobutanizer along with the overhead from the debutanization of the alkylate. The overhead from this deisobutanizer thus includes all of the isobutane from the initial feed stock (except that which has been combined as alkylate) including that in the portion of the initial fraction supplied to the polymerization operation and the large excess supplied to the alkylation operation, together with some butane, and perhaps butene-2, included to insure the recovery of all of the isobutane.

The overhead also often contains propane or other lighter hydrocarbons which have not been eliminated from the system, and accordingly this product is introduced advantageously into the depropanizer through which the alkylation reaction zone feed is passed, supplemented, if it is available, by isobutane from outside sources. If the operations are such that this isobutane contains little or no propane or other light hydrocarbon, it may be introduced directly into the alkylation reaction zone without passing it through the depropanizer.

The bottoms from the deisobutanizer contain the polymers, butane, butene-2, if any passes through the polymerization operation without reaction and any other hydrocarbons heavier than the butanes and butylenes present in the feed to the deisobutanizer. This product is treated to recover the desired polymer content, and may be used in controlling the refinery vapor pressure.

The invention will be further described in connection with the appended drawing, which illustrates, by flow sheet, a plant which embodies the invention. Such apparatus as pumps and the like are not shown on the flow sheet, it being understood that these will be used where and as required, and of appropriate design and capacity.

The plant illustrated is especially designed for producing polymer and alkylate from cracked distillate gases, without any large supply of outside isobutane, although it may readily be operated so as to take advantage of any such supply.

The unit will be described in connection with its general operation, and a specific example of operation will be given.

A cracked distillate is introduced by line 10 to a debutanizer 12. This is operated to insure that substantially all of the isobutane goes over as an overhead product, along with normal butane, butylenes, and lighter products. The overhead passes to a partial condenser 14 which condenses enough liquid to supply the reflux to the debutanizer. The remaining gas passes through the total condenser 16 to the surge tank 18. If the product contains any substantial amount of sulfur, it may be passed through the line 20 to the hydrogen sulfide removal tower 22 and thence to the caustic wash apparatus 24 for removal of mercaptans, although either or both of these operations may be omitted if unnecessary. The liquid, with or without appropriate purification, is divided at the point 26 (or, if purification is unnecessary, the point 27) into two portions. Instead of treating all of the hydrocarbon to remove sulfur, such treatment may be applied to one or the other (or both) of the divided streams, usually that fed to the alkylation unit. One portion, which contains slightly less olefin than corresponds to the total amount of isobutane in the gases and any extraneous isobutane available, on a molal basis, is passed by the line 28 to the depropanizer 30. This depropanizer is operated so that the overhead carries a small amount of isobutane, to provide complete removal of any propylene which the feed may contain. The bottoms from this depropanizer go to the alkylation system as will be explained. The overhead is passed to the condenser 32, which condenses enough liquid to supply reflux to the depropanizer, and the remaining gas is passed through the line 34 and mixed with the portion of the cracked distillate gases to be introduced into the polymerization unit. The feed to the polymerization unit thus contains all of the propylene and propane, and a portion of the isobutane, butane, and butylenes in the overhead of the debutanizer 12. This stock is passed to the vaporizer and heater 40, and thence to the polymerization towers 42, in which the olefins are polymerized, as with the used of a phosphoric acid catalyst, in the known way. A portion of the liquid feed may be led to the catalyst towers through the line 44, without vaporizing and heating it, for use as a quench, to prevent too great rise in temperature in the polymerization towers.

The product from the towers 42 passes to the total condenser 46 and thence to the surge tank 48 and to the depropanizer 50. The overhead from this depropanizer is passed to the condenser 52 which condenses enough liquid to supply the necessary reflux to the depropanizer. The remaining gas goes to storage or is used as fuel or for other purposes. The bottoms from the depropanizer 50 contain any isobutane and butane fed to the polymerization towers, as well as any unpolymerized olefins heavier than propylene. This depropanizer should be operated so that a small amount of propane is retained in the bottoms, to insure the recovery of all of the isobutane. It is advantageous to pass some of the bottoms product from the depropanizer, as by the line 55, back to the condenser 46 to make the liquid in the surge tank 48 heavier and enable it to hold in more of the light components and reduce losses of isobutane through the relief line 54.

The remaining portion of the bottoms from the depropanizer is passed through the line 56 to the caustic washer 58, where it is washed with caustic alkali in the usual way. It then passes to the deisobutanizer 60, where it joins the butane and lighter fractions from the alkylation unit.

The overhead from this unit 60 contains the isobutane and lighter components which remain, and is passed through the line 61 either to the depropanizer 30, or directly to the alkylation unit. In any case, it joins the depropanized fraction containing butylenes, and is fed to the alkylation reaction zone, after cooling in the heat exchanger 62, settling of water in the water settler 64 and further cooling in the chiller 66 so that its temperature, when introduced into the alkylation zone, is either about that maintained therein (if the unit is supplied with cooling means) or somewhat below the temperature in the unit, if precooling is used to prevent too great a rise in temperature in the alkylation reaction. In the alkylation reaction vessels 68, the hydrocarbon mixture is brought into intimate contact with strong sulfuric acid, of strength of about 92-98%, with alkylation of the butylenes by the isobutane to form the desired alkylate, mainly isooctane. The reaction mixture is passed into settlers or stratifiers, such as the acid settlers 70 and 72 in which the hydrocarbon is separated from the acid. In the unit illustrated, there are two acid settlers 70 and 72, most of the acid being separated in the first, although some is advantageously separated in the second. Settling time is usually about one hour in the first settler.

The acid is withdrawn from the bottom of the settlers, and a small proportion, say 0.5-1.5 lbs. per gallon of alkylate, is purged through the lines 74 and 76. Sufficient fresh acid to replenish the supply and keep up the strength of the acid is supplied through the line 78. The hydrocarbon separated is passed into heat exchange relationship with the hydrocarbon feed in the heat exchanger 62, thence is subjected to a caustic wash in the washer 80, and thence is passed to the debutanizer 82, which is operated to insure the removal of all of the isobutane from the hydrocarbon mixture. The overhead passes to the condenser 84, from which reflux is supplied, and the remaining overhead is led to the deisobutanizer 60, along with the bottoms from the depropanizer 50 of the polymerization unit.

The bottoms from the debutanizer 82 are supplied to the alkylate re-run still 86, the overhead product of which is condensed as finished alkylate, the bottoms from which are used as desired.

In the deisobutanizer 60, the isobutane and lighter fractions are taken off as an overhead product, and either stored, or led directly back to the alkylation reaction feed, while the bottoms product which contains the polymerized hydrocarbon as well as most of the normal butane introduced and such of the butene-2 as passes through the polymerization unit without reaction, is led to storage or further fractionated as desired.

Additional isobutane from other sources may be supplied either to the deisobutanizer 60 by the line 88, with or without caustic washing, or, if sufficiently pure, directly to the feed to the alkylation operation by the line 90.

By this method of operation, complete utilization of the available isobutane is assured, while at the same time the maximum amount of useful product is produced from the available olefins. Furthermore, the olefin polymer, which, while useful, does not have the high octane value of the alkylate, is obtained as a separate product, not in admixture with the alkylate.

The invention will be further illustrated by the following specific example, but it is not limited thereto.

2450 barrels per day of overhead from the debutanizer 12, after treatment to remove hydrogen sulfide and mercaptans, having the composition:

|  | Per cent |
|---|---|
| Ethylene | 0.5 |
| Ethane | 5.3 |
| Propylene | 6.0 |
| Propane | 21.5 |
| Isobutane | 6.3 |
| Isobutylene | 11.3 |
| Butylene-1 | 6.7 |
| N-butane | 30.8 |
| Butylene-2 | 6.7 |
| C5 | 2.9 | is fed to the point 26. It is divided into two streams, 839 barrels per day going through the line leading to the polymerization towers 42 and 1611 barrels to the depropanizer 30. At the same time, 2995 barrels of overhead from the deisobutanizer 60 is fed to the depropanizer 30. The overhead from the depropanizer 30, 886 barrels per day, having the composition:

|  | Per cent |
|---|---|
| Ethylene | 0.9 |
| Ethane | 11.1 |
| Propylene | 14.6 |
| Propane | 72.2 |
| Isobutane | 1.2 | is fed through line 34 to the polymerization towers. The bottoms from the depropanizer 30, 3720 barrels per day, having the composition:

|  | Per cent |
|---|---|
| Propane | 2.8 |
| Isobutane | 60.9 |
| Isobutylene | 5.1 |
| Butylene-1 | 3.1 |
| N-butane | 24.0 |
| Butylene-2 | 2.9 |
| C5 | 1.2 | are fed to the alkylation reactors, after cooling to around 50° F. At the same time, an equal volume of sulfuric acid of 92–98% strength, consisting of recycle acid and fresh acid, is fed to these reactors. The temperature is maintained therein at about 50° F. The hydrocarbon products from the alkylation, after removal of acid and caustic washing, is fed to the debutanizer 82. The bottoms from this debutanizer, 784 barrels per day, having the composition:

|  | Per cent |
|---|---|
| N-butane | 0.9 |
| C5 | 5.9 |
| C6+alkylate | 93.2 | is charged to the re-run still, from which there is obtained 696 barrels of overhead product and 88 barrels of bottoms product per day. The overhead from the debutanizer 82, 2801 barrels per day, having the composition:

|  | Per cent |
|---|---|
| Propane | 3.6 |
| Isobutane | 64.7 |
| N-butane | 31.7 | is charged to the deisobutanizer 60 along with 955 barrels per day of extraneous isobutane stock having the composition:

|  | Per cent |
|---|---|
| Ethane | 1.3 |
| Propane | 30.4 |
| Isobutane | 33.6 |
| N-butane | 33.6 |
| C5 | 1.1 | and 622 barrels per day of depropanized polymerization products having the composition:

|  | Per cent |
|---|---|
| Propane | 0.6 |
| Isobutane | 7.9 |
| Isobutylene | 1.4 |
| Butylene-1 | 1.6 |
| N-butane | 42.0 |
| Butylene-2 | 4.8 |
| C6+polymer | 41.7 |

The deisobutanizer overhead amounts to 2995 barrels per day, having the composition:

|  | Per cent |
|---|---|
| Ethane | 0.4 |
| Propane | 13.2 |
| Isobutane | 72.6 |
| Isobutylene | 0.3 |
| Butylene-1 | 0.2 |
| N-butane | 13.3 | and the bottoms amount to 1383 barrels per day, having the composition:

|  | Per cent |
|---|---|
| Isobutane | 0.5 |
| Isobutylene | 0.1 |
| Butylene-1 | 0.3 |
| N-butane | 77.4 |
| Butylene-2 | 2.2 |
| C5 | 0.8 |
| C6+polymer | 18.7 |

The overhead from the depropanizer 50 is released to storage and used as desired. The compositions given are in liquid percentages.

The units described above, and their operation, may be varied to a considerable extent without departing from the invention. For example, in some cases, and particularly where the alkylation reaction is carried out at a low temperature, it may be desirable to run the deisobutanizer 60 in such a way as to substantially remove whatever butene-2 may be introduced into it. Ordinarily, butene-2 is less susceptible to polymerization than isobutylene and butene-1, and hence may be carried over through the polymerization towers in considerable proportions. The alkylated product from butene-2 does not seem to be as good as that from isobutylene or butene-1, and hence it may be desirable to partially or largely eliminate butene-2 from the alkylation feed.

On the other hand, if the alkylation reaction is carried out at a relatively high temperature, it may be desirable to include the butene-2 in the feed to the alkylation reaction, because at relatively high temperatures, the other butylenes seem to give larger proportions of polymers in the alkylate product, giving both a decreased yield and an inferior product as compared with butene-2.

I claim:

1. The process of producing motor fuel from a hydrocarbon mixture containing isobutane, butylenes and other hydrocarbons, the molar ratio of butylenes to isobutane being in excess of one, which comprises dividing the mixture into two portions, the first containing no more butylenes than corresponds to available isobutane on a molal basis, and the second the remainder of the mixture, subjecting the second portion to a polymerization operation, recovering isobutane from the product of the polymerization operation, adding it to the first said portion and subjecting the resulting mixture to an alkylation operation, whereby an alkylated product and a polymerized product, useful as motor fuels, are separately produced.

2. The process as in claim 1, in which additional isobutane is supplied from an outside source, and the first portion is of such proportions that it contains about that amount of butylenes which corresponds, on a molal basis, to the total isobutane in the original mixture plus that additionally supplied.

3. The process as in claim 1, in which the portion of the mixture subjected to alkylation is first subjected to separation of the hydrocarbons lighter than the four carbon atom hydrocarbons, and the light hydrocarbons so separated are supplied to the polymerization operation.

4. The process as in claim 1, in which the hydrocarbon mixture is that resulting from the debutanization of a cracked stock.

5. The process as in claim 1, in which a large excess of isobutane is supplied to the alkylation operation by recovering unreacted isobutane from the alkylate product and returning it to the alkylation operation.

6. The process as in claim 1, in which the alkylate product is subjected to debutanization in a debutanizer, and the overhead product from the debutanizer is subjected, along with the polymer product and in the same deisobutanizer, to deisobutanizing, the isobutane so recovered being supplied to the alkylation operation.

7. The process as in claim 1, in which the polymer product is subjected to depropanization and the alkylate product is subjected to debutanization in a debutanizer, and the overhead product from the debutanizer is subjected, along with the depropanized polymer product and in the same deisobutanizer, to deisobutanizing, the isobutane so recovered being supplied to the alkylation operation.

8. In the production of motor fuel by the alkylation of isobutane with butylenes with the use of an excess of isobutane in the reaction mixture and separation of the excess isobutane from the heavier hydrocarbons in a deisobutanizer, the improvement comprising subjecting a hydrocarbon mixture containing isobutane and olefins with a molar ratio of olefins to isobutane in excess of one to a polymerization operation, and supplying to said deisobutanizer the isobutane containing hydrocarbon mixture obtained from said polymerization operation.

9. A process for producing more valuable products from a hydrocarbon gas containing propene, butenes and butanes which comprises dividing said gas into two portions, depropanizing one of said portions to separate a butane-butene fraction from $C_3$ hydrocarbons, combining the latter with the other portion of said gas and subjecting the resultant mixture to polymerization, separating from the polymerization products a fraction containing normally liquid polymers and butanes, introducing said butane-butene fraction to an alkylation zone and therein alkylating isobutane with butenes, separating normally liquid alkylation products from residual $C_4$ hydrocarbons, combining the latter with said fraction containing normally liquid polymers and butanes, fractionating the resultant mixture to separate an isobutane fraction therefrom, and supplying said isobutane fraction to the alkylation zone.

EUGENE C. HERTHEL.